United States Patent [19]
Johnson et al.

[11] Patent Number: 6,108,761
[45] Date of Patent: Aug. 22, 2000

[54] METHOD OF AND APPARATUS FOR SAVING TIME PERFORMING CERTAIN TRANSFER INSTRUCTIONS

[75] Inventors: David C. Johnson, Roseville; John S. Kuslak, Blaine; Gary J. Lucas, Pine Springs, all of Minn.

[73] Assignee: Unisys Corporation, Blue Bell, Pa.

[21] Appl. No.: 09/026,840

[22] Filed: Feb. 20, 1998

[51] Int. Cl.[7] .................................................... G06F 12/00
[52] U.S. Cl. .............................. 711/214; 711/5; 711/220; 712/211; 712/218
[58] Field of Search ................................ 711/5, 220, 214; 712/211, 218; 364/200; 395/375, 415, 425

[56] References Cited

U.S. PATENT DOCUMENTS

| | | | |
|---|---|---|---|
| 3,815,101 | 6/1974 | Boss et al. | 340/172.5 |
| 4,096,568 | 6/1978 | Bennet et al. | 364/200 |
| 4,354,231 | 10/1982 | Carlsson et al. | 364/200 |
| 4,827,406 | 5/1989 | Bischoff et al. | 364/200 |
| 5,155,834 | 10/1992 | Ryan et al. | 395/425 |
| 5,379,392 | 1/1995 | Alferness et al. | 395/400 |
| 5,414,821 | 5/1995 | Nguyen et al. | 395/375 |
| 5,479,627 | 12/1995 | Khalidi et al. | 395/415 |
| 5,504,871 | 4/1996 | Takashi | 395/405 |
| 5,732,404 | 3/1998 | Johnson et al. | 711/2 |
| 5,832,292 | 11/1998 | Nguyen et al. | 395/800.23 |
| 5,867,699 | 2/1999 | Kuslak et al. | 395/587 |

Primary Examiner—Do Hyun Yoo
Assistant Examiner—Pierre M Vital
Attorney, Agent, or Firm—Charles A. Johnson; Mark T. Starr; Nawrocki, Rooney and Sivertson, P.A.

[57] ABSTRACT

A method and apparatus for reducing processor response time to selected transfer instructions in an multi-instruction processor. The response time is shortened by using a fast path to generate addresses for selected transfer instructions. In this fast path a base address, retained in a register from a previous instruction, is summed with an offset from the current instruction to obtain an absolute address for memory accessing. Before the fast path is entered determinations are made whether the instruction is a particular transfer instruction of a particular class and subclass, and whether the base address is different than the base address for the previous instruction. Even through the fast path is entered the usual absolute address generator path is also entered where the instruction is subjected to both high and low limit tests. If the high and low limit test determine a different base is to be used, the absolute address from the main address generator is used, instead of the absolute address from the LXJ fast path, and the system is restored to the conditions that would have prevailed if the fast path had not been entered.

10 Claims, 5 Drawing Sheets

METHOD OF AND APPARATUS FOR SAVING TIME PERFORMING CERTAIN TRANSFER INSTRUCTIONS

CROSS REFERENCE TO CO-PENDING APPLICATIONS

The present application is related to U.S. patent application Ser. No. 09/026935, filed on Feb. 20, 1998 entitled "Method of and Apparatus for Speeding Up the Execution of Normal Extended Mode Transfer Instructions".

BACKGROUND OF THE INVENTION

1. Field of the Invention

The present invention generally relates to general purpose digital data processing systems and more particularly relates to transfer instructions for such systems receiving virtual addresses from application programs which must be translated into absolute addresses.

2. Description of the Prior Art

It is now common in large scale data processing systems to permit software developers to treat real storage as virtual memory. This is a technique wherein all memory accesses by a specific use program are relative in nature. The major advantage of this approach is that memory management can be efficiently performed by the system at the time of program execution depending upon resource availability and requests from the users. This memory management appears transparent to the user. The 2200/900 system available from the assignee of the present invention including explanatory documentation, and incorporated herein by reference, is such a system employing virtual addressing.

This system, as well as all other systems utilizing virtual addresses, must convert instructions in the operating programs from virtual to real addresses. To translate from the virtual address some systems such as U.S. Pat. No. 4,827,406 issued to Bischoff et al. use a translation table.

Nguyen et al. U.S. Pat. No. 5,414,821 describes the 2200/900 computer system of Unisys which employs virtual addressing converted to an absolute address by adding a base address to an offset provided by the virtual address. Nguyen et al., assigned to the same assignee as the present invention, is hereby also incorporated by reference.

Essentially these systems accomplish the translation from virtual addresses to absolute addresses by providing a base address, which indicates one of a plurality of base memories, plus an offset value, which indicates a particular word location within the indicated base memory, and summing the two together. The summing operation is performed using an special adder which sums the two quantities to provide a unique absolute address. The information needed to perform this operation is provided by the instruction which contains both the base address and the offset value for summation. This approach includes transfer instructions. Since both the base address and the offset are obtained from the instruction and are summed to obtain each absolute address, this effectively makes an implicit assumption that the transfer instruction will be to a different base address. For particular transfer instructions however this is not the case and the transfer remains within the same base memory address. Since the base address does not change, and since the base address typically remains within a hardware register, advantage could be taken of the fact that the base address does not change to eliminate some of the processing steps to reduce the response time for these particular transfer instructions.

None of the existing instruction processors have provisions for using the previous base address for transfer instructions which remain within a given base memory to reduce the instruction response time.

SUMMARY OF THE INVENTION

The present invention relates to multi-processors with multiple memory banks which have virtual addresses provided by the application programs. In previous apparatus virtual addresses for certain transfer instructions are converted to absolute addresses in an address generator by adding the offset provided by the current instruction to a base address provided by the same current instruction. This process automatically includes any change in the base address in the absolute addresses.

The present invention provides apparatus and method for reducing the response time of LXJ transfer instructions over the time required by the prior art by providing a LXJ fast path for selected LXJ instructions including address generation. A LXJ instruction is a particular class of transfer instruction which is adapted to the present invention approach. A number of transfer instructions have other operations included which preclude the approach of the present invention. The present invention makes the implicit assumption that certain selected transfer instructions will not result in a new base address whereas previous apparatus provides for an assumption that transfer instructions would always result in a new base address.

The LXJ fast path generates an absolute address by adding the offset provided by the current LXJ instruction to the base address from the previous instruction, which is retained in a register. The LXJ fast path uses adder apparatus other then a main address generator to provide a more rapid response. The main address generator provides logic to test the offset against the upper and lower limits for all four base addresses and generate absolute addresses for all four base memories simultaneously, whereas the adder apparatus of the present invention is faster since it only provides for one absolute address.

The base address for the previous instruction is stored in a hardware register after each instruction, and is readily available to calculate an absolute address, whenever the base address is not changed by the current instruction.

Before the LXJ fast path is enabled and entered determinations are made whether the instruction is of the proper LXJ class and subclass, whether the base address, which will be altered, is the same as the base address of the previous instruction, and whether the instruction is of a certain type. When these determinations are affirmative then the LXJ fast path is attempted.

The LXJ fast path uses a simplified adder to add the previous base address to the offset provided by the current instruction to obtain the absolute address for the target instruction.

Whether the LXJ fast path is entered or not, the main address generation is always activated using the normal instruction path to obtain the target absolute address. This includes testing the instruction offset against the high and low limits for all four base addresses.

If the tests are all passed then the absolute address from the LXJ fast path is used to fetch the target instruction. This is accomplished by a selector in the instruction adder generation logic which can select either the LXJ fast path absolute address or the main address generator absolute address.

Whenever the absolute address of the main address generator is used instead of the absolute address of the LXJ fast path, the bank address for the target instruction is entered into the bank address register to replace the bank address from the previous instruction. This is necessary to establish the proper environment for the next instruction.

In addition, an instruction fetched by the absolute address generated by the LXJ fast path could be aborted and replaced by instruction addressed by the absolute address from the main address generator. The apparatus necessary to abort an address is already available as part of the system error correction apparatus and is merely called upon by the present invention.

The main address generator is always operated in parallel with the LXJ fast path to obtain an absolute address. Therefore the absolute address from the main address generator is always available for selection if the absolute address from the LXJ fast path is aborted.

Since the LXJ fast path test uses the previous base address, the LXJ fast path operation can be started one cycle earlier than the main address generator operation, which must wait for the base address from the current instruction. This permits beginning the LXJ fast path process one cycle earlier than the main address generator. Further, the time required to compute the absolute address using the LXJ fast path is reduced by one cycle because in the main address generator upper and lower limit testing is performed and four absolute addresses are calculated for four memories whereas in the LXJ fast path only one absolute address is calculated. This combination of an earlier start time and a shorter computation time provides a total two cycle time savings whenever the LXJ fast path is used.

BRIEF DESCRIPTION OF THE DRAWINGS

Objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION

Figure 1:
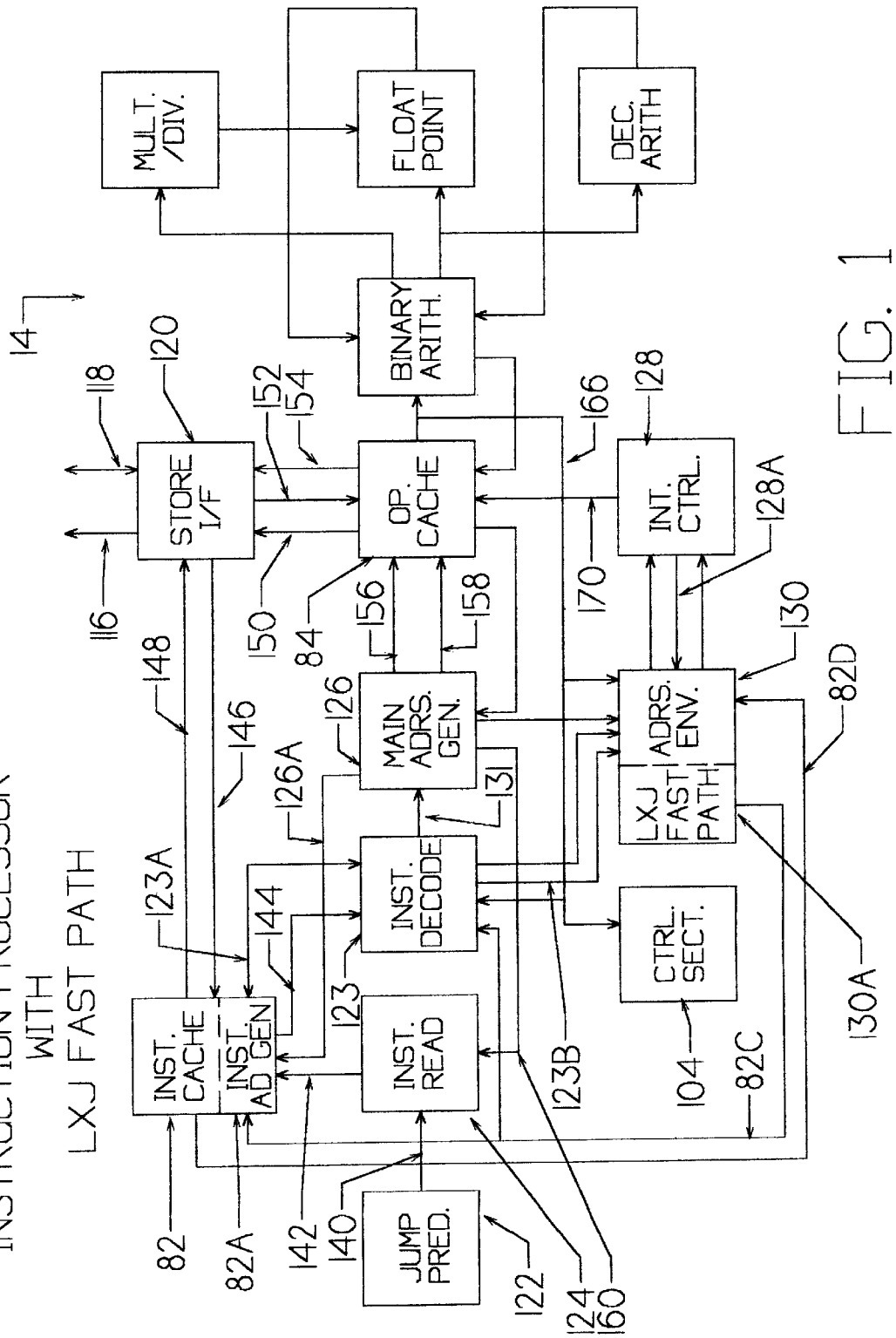
FIG. 1 is a detailed block diagram of an instruction processor incorporating the LXJ fast path.

FIG. 1 is a block diagram of instruction processor 14 including the new elements of the present invention and showing their interaction. The major data paths shown for the previous apparatus are identified by number, while the data paths added for the LXJ fast path have a number and a letter postscript identifier.

The interface to system memory consists of write cable 116 and read/write cable 118. The functions of a write stack is incorporated within store interface 120. Addressing information for store interface 120 is sent from instruction cache 82 via cable 148 and operand cache 84 via cable 150 for a corresponding cache miss. Instructions are sent to instruction cache 82 via path 146. Operand data read by system memory is transferred from store interface 120 to operand cache 84 by path 152. Similarly, write operand data is sent from operand cache 84 to store interface 120 via path 154.

Instructions to be executed are addressed by instruction read 124 as follows. The addresses are computed using one of the base registers located within address environment 130, explained in more detail below. If the instruction is the next sequential instruction, its instruction is determined by incrementing the program address counter. If the instruction to be executed was a branch or jump instruction, the address was computed by main address generator 126 and supplied via path 160. Alternatively, the address is supplied by jump prediction 122 via path 140 during operation in the jump prediction mode. The address of the next instruction was provided to instruction cache 82 via path 142.

The next addressed instruction is fetched from instruction cache 82 if a match is found. If the request results in a cache miss, system memory is requested to read the memory block containing the instruction. In either case, the instruction is provided to instruction decoder 123 via path 144. The instruction is decoded through the use of a microcode controller by instruction decode 123, and the operand address is computed by main address generator 126 from the data received via path 131.

Operand cache 84 contains a general register stack which is addressed by the output of address generator 126 received from path 158. Direct operands are received on path 156. If a match is not made in operand cache 84, a read request is made of system memory through store interface 120. If a match is found in operand cache 84 or if the instruction specifies a direct operand received on path 156, the operand data is more immediately produced. In either case, the operand data is routed in accordance with the operation to be performed as specified by the instruction.

One category of instructions, those pertaining to the present invention, involves a change to the base registers within addressing environment 130. The data is supplied to addressing environment 130 via path 166. Interrupt control 128 provides the interrupt data to operand 84 via path 170. Control section 104 provides the overall microcode control.

The present invention provides additional apparatus for providing an absolute address for selected transfer instructions by using an additional fast path, described below, when the instruction refers to one of four bank addresses in memory.

LXJ fast path 130A, shown in FIG. 1, contains new functions, which are incorporated within address environment 130, and used to initiate a LXJ fast path whenever the transfer instruction and other conditions are suitable. Instruction address generator 82A, which is an existing part of instruction cache 82, also has elements added which select either an absolute address calculated in instruction address generator 82A or the absolute address generated in main address generator 126 depending upon conditions described below. Other system correction functions, which are used whenever the fast path is entered but the data is not used, are also used. These will be described later.

Lines 82C from LXJ fast path 130A to instruction address generator 82A and instruction decode 123, lines 82D from instruction address generator 82A to address environment 130, lines 123A from instruction address generator 82A to instruction decode 123, lines 126A from main address generator 126 to instruction address generator 82A, lines 126B from main address generator 126 to address environment 130, lines 123B from instruction decode 123 to LXJ fast path 130A and lines 128A from interrupt control 128 to address environment 130 are paths used in the LXJ fast path operation.

The instructions are initially processed in the usual manner prior to the interception of LXJ fast path 130A. In general, normal instruction execution of the selected transfer instructions occur with the LXJ fast path operations intervening only at critical junctures. Instructions received over lines 118 are interpreted and provided to instruction decode 123 as described in the prior description and referenced documentation, then conveyed over lines 123B to address environment 130 and to LXJ fast path 130A.

Figure 2:
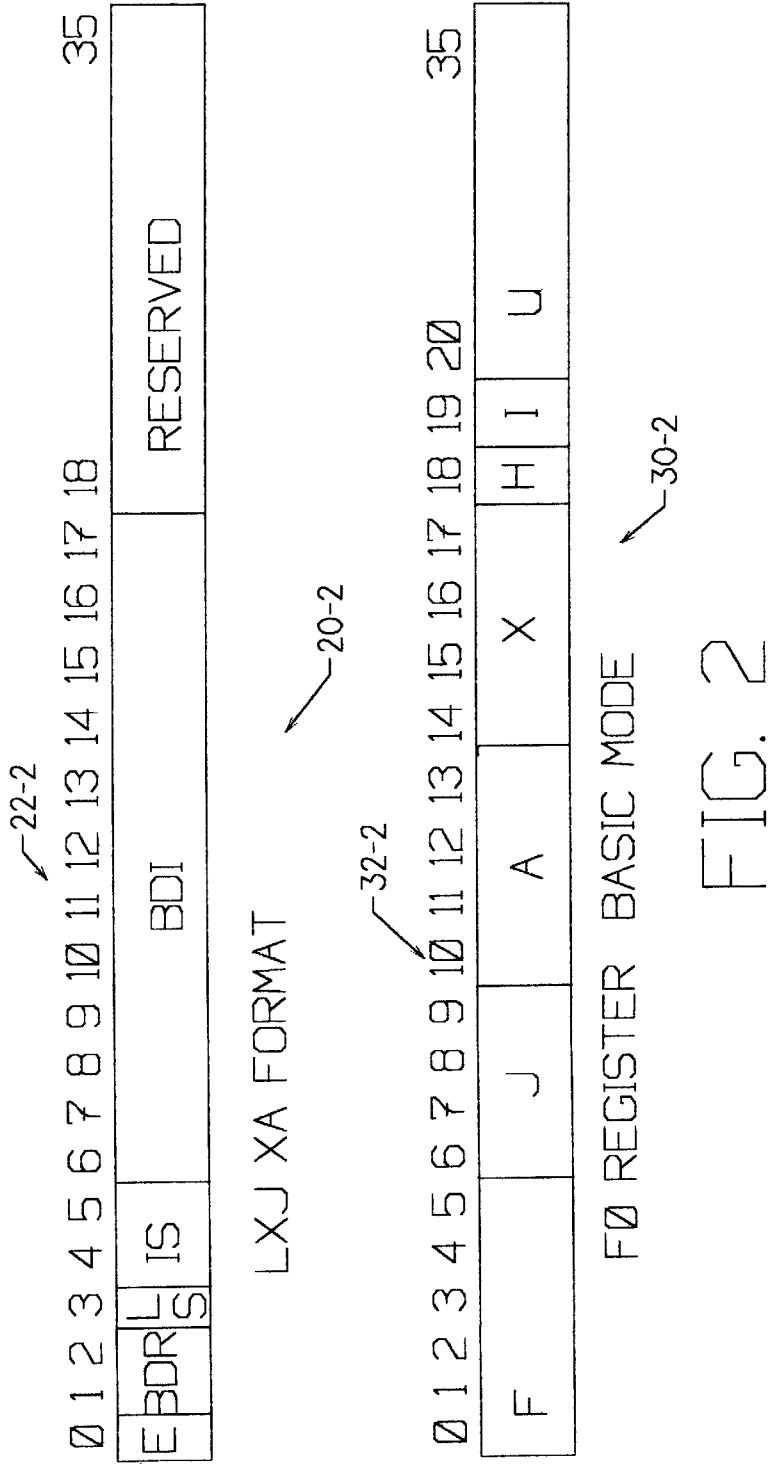
FIG. 2 illustrates various instruction and register formats.

The formats for word zero of a four word bank descriptor 10-2, LXJ Xa Format 20-2, and FO Register Basic Mode 30-2 are shown in FIG. 2. Bank descriptor word zero 10-2 is conveyed from operand cache 84 over lines 166 to address environment 130 in the usual operating mode where it is received by address environment 130 and also by LXJ fast path 130A, as part of the same block.

Figure 3:
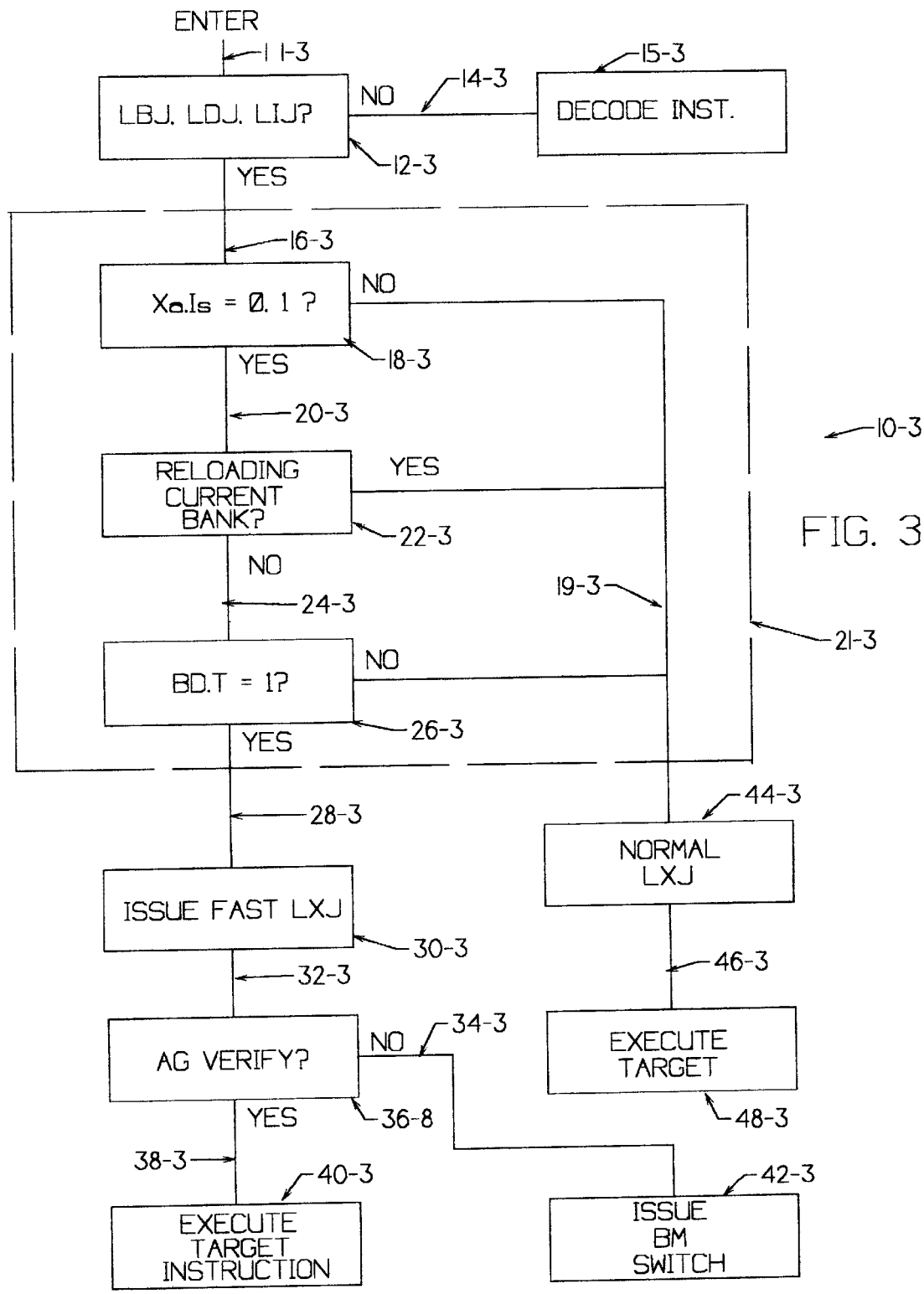
FIG. 3 is a flow chart of the qualifying portion of the LXJ fast path.

The functions performed by LXJ fast path 130A are shown in the steps of FIG. 3, 10-3. Data, which is received over lines 144, enters the steps through path 11-3 to initial step 12-3. Step 12-3 determines whether the instruction is a LBJ, LDJ or LIJ instruction, which are the transfer instructions capable of the fast path operation. If step 12-3 determines than the instruction is none of these instructions then step 15-3 is entered over path 14-3. Step 15-3 will then decode the instruction, using existing apparatus and existing operations rather than the LXJ fast path.

If the response to step 12-3 is Yes then step 18-3 is entered over path 16-3. In step 18-3 the value of Xa.IS is tested to determine if it is 0 or 1. FIG. 2 shows LXJ.XA format 20-2 with bits 22-2 extending from 0 through 35. Xa.Is is contained in bits 4 and 5 labeled IS in the figure. If the Xa.Is bits do not represent 0 or 1 then the instruction could not be a fast LXJ instruction, the response to step 18-3 is No and step 44-3 is entered over path 19-3. Step 44-3 will be described later.

If the Xa.Is bits represent 0 or 1 then the instruction could be a fast LXJ instruction, the response to step 18-3 is Yes and step 22-3 is entered over path 20-3. In step 22-3 the determination is made whether the current bank of memory is being reloaded. If the response to step 22-3 is Yes then step 44-3 is entered over path 19-3. If the response to step 22-3 is No then step 26-3 is entered over path 24-3.

Step 26-3 tests whether the bank descriptor type (BD.TYPE) shown in FIG. 2 where the bank descriptor 10-2 has bits 12-2 extending from 0 through 35 with bits 8–11 labeled TYPE designating the BD.TYPE in hexadecimal notation. If bits 8–11 do not designate 1 then the data bank is not of the proper type, the response to step 26-3 is No and step 44-3 is entered through path 19-3. If the response to step 28-3 is Yes then step 30-3 is entered through path 28-3.

Steps 18-3, 22-3 and 26-3, enclosed by block 21-3, are shown as occurring in ascending numeric order. This test order is not critical in that the tests can be performed in any order, or can even be performed in parallel if the same results are obtained. The critical result of the tests in block 21-3 is that the result of step 18-3 must be Yes, and the result of step 22-3 must be No, and the result of step 26-3 must be Yes, for step 30-3 to be entered through path 28-3, otherwise step 44-3 will be entered through path 19-3.

Issue fast LXJ step 30-3 will then set line 82C which informs instruction address generator 82A that the LXJ fast path should be attempted which initiates the LXJ fast path addition.

Step AG Verify? 36-3 is then entered through path 32-3. Step 36-3 performs a full four address verify on the offset. This tests the offset against the upper and lower limits for all four base addresses. This ensures that the offset does not address an area outside of the limits for any base memory.

If the response to step 36-3 is No, indicating a problem with the address range, then step Issue BM Switch 42-3 is entered through path 34-3. BM switch 42-3 enables a switch which toggles the output of instruction address generator 82A from the fast path results to the main address generator 126, activates hardware to abort the instructions which have been incorrectly fetched and activates hardware to capture the current base. The switching operations will be described later as part of the LXJ fast path description.

If the response to step 36-3 is yes then Execute Target Instruction 40-3 is entered through path 38-3. Step 40-3 will utilize the absolute address from instruction address generator 82A to provide the absolute address to execute the instruction.

Step Normal LXJ 44-3, when entered as a result of tests described above over path 19-3, performs the LXJ instruction using the previous apparatus and path without an attempt to use the fast path. The previous apparatus and path are used because the LXJ instructions have been determined to be unsuitable candidates for the fast path operation. Step 44-3 will then enter step Execute Target 48-3 over path 46-3. Step 48-3 will obtain the target information from the memory in the conventional manner using the memory target information derived using the apparatus with no fast path involvement.

Figure 4:
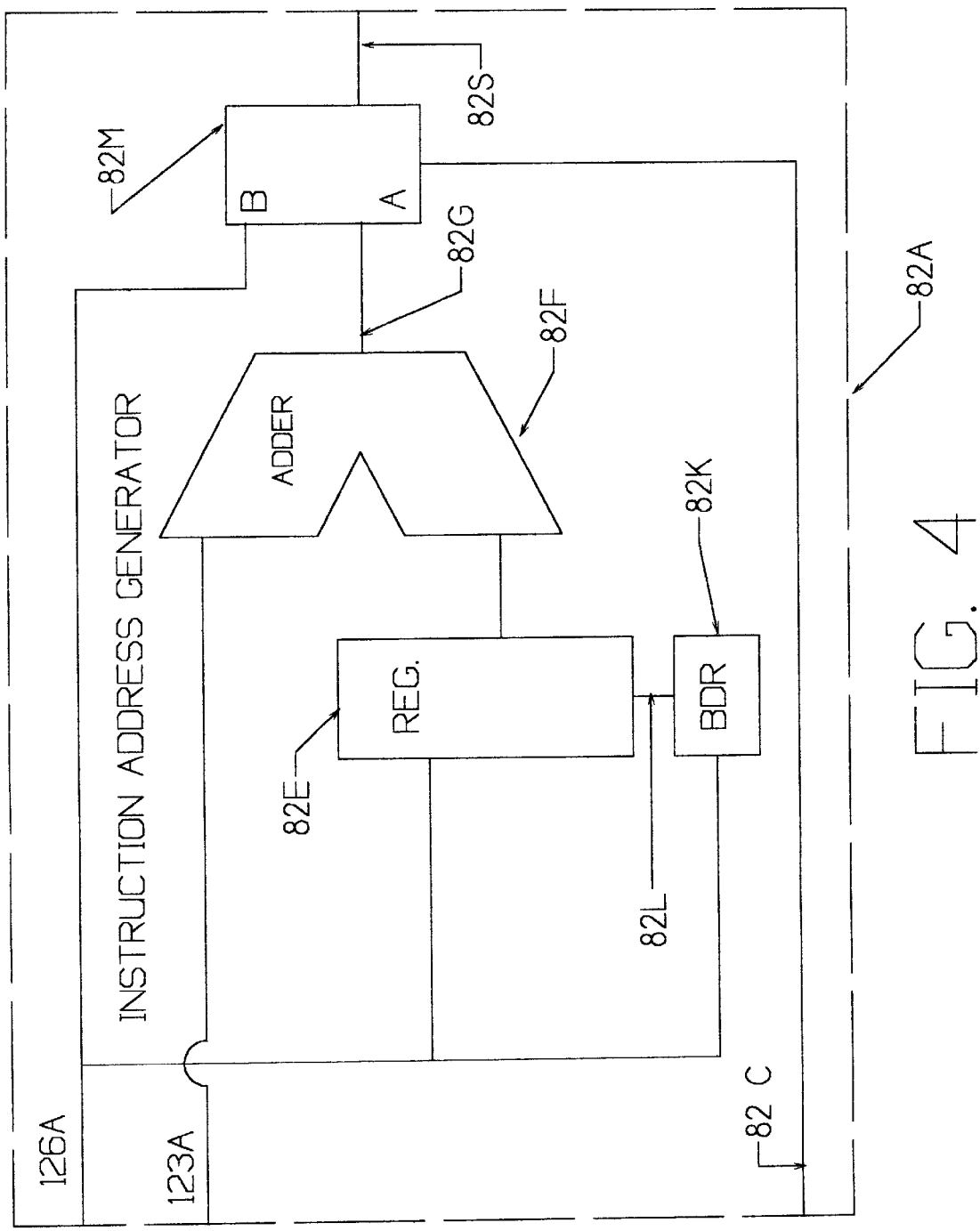
FIG. 4 is a block diagram of the LXJ fast path computation and selection apparatus.

FIG. 4 shows existing instruction address generator 82A, a present part of instruction cache 82. The present invention has added register 82E and BDR 82K to enable the receipt of data into the register plus line 126A from main address generator 126. Line 126A provides a number of quantities: an absolute address to the B input of selector 82M, generated by the main address generator 126, a base address for register 82E and a control line for BDR 82K, which when high results in BDR 82K enabling the loading of new base register data into register 82E.

Register 82E will retain the previously loaded base address unless the control line in line 126A to BDR 82K goes high which loads the base address from the current instruction into the register.

To generate an absolute address adder 82F sums the inputs from line 123A, which provides the offset value, and register 82E, which provides the base address. The output of adder 82F provides the absolute address to the A input of selector 82M. Line 82C when high will cause selector 82M to select the A input, and when low will select the B input and provide the selected input to instruction cache 82 on line 82S.

As described above register 82E contains the previously loaded base register unless BDR 82K enables register 82E in step 42-3 or 44-3 in FIG. 3. This provides the current base address to register 82E and is necessary to provide the correct value for the next instruction whenever the LXJ fast path is not entered.

In addition, step 42-3 aborts instructions initiated as a part of the LXJ fast path operations and switches line 82C low, whenever the LXJ fast path is not entered, which switches selector 82M from input A to input B. The instruction abort procedure is already present for error correction and is merely called by step 42-3. The A input is the absolute address from instruction address generator 82A and the B input is the absolute address from main address generator 126. An absolute address selected by selector 82M, as described above, is transferred to line 82S and operated upon by instruction cache 82 to complete the execution of the instruction in the usual manner.

Figure 5:
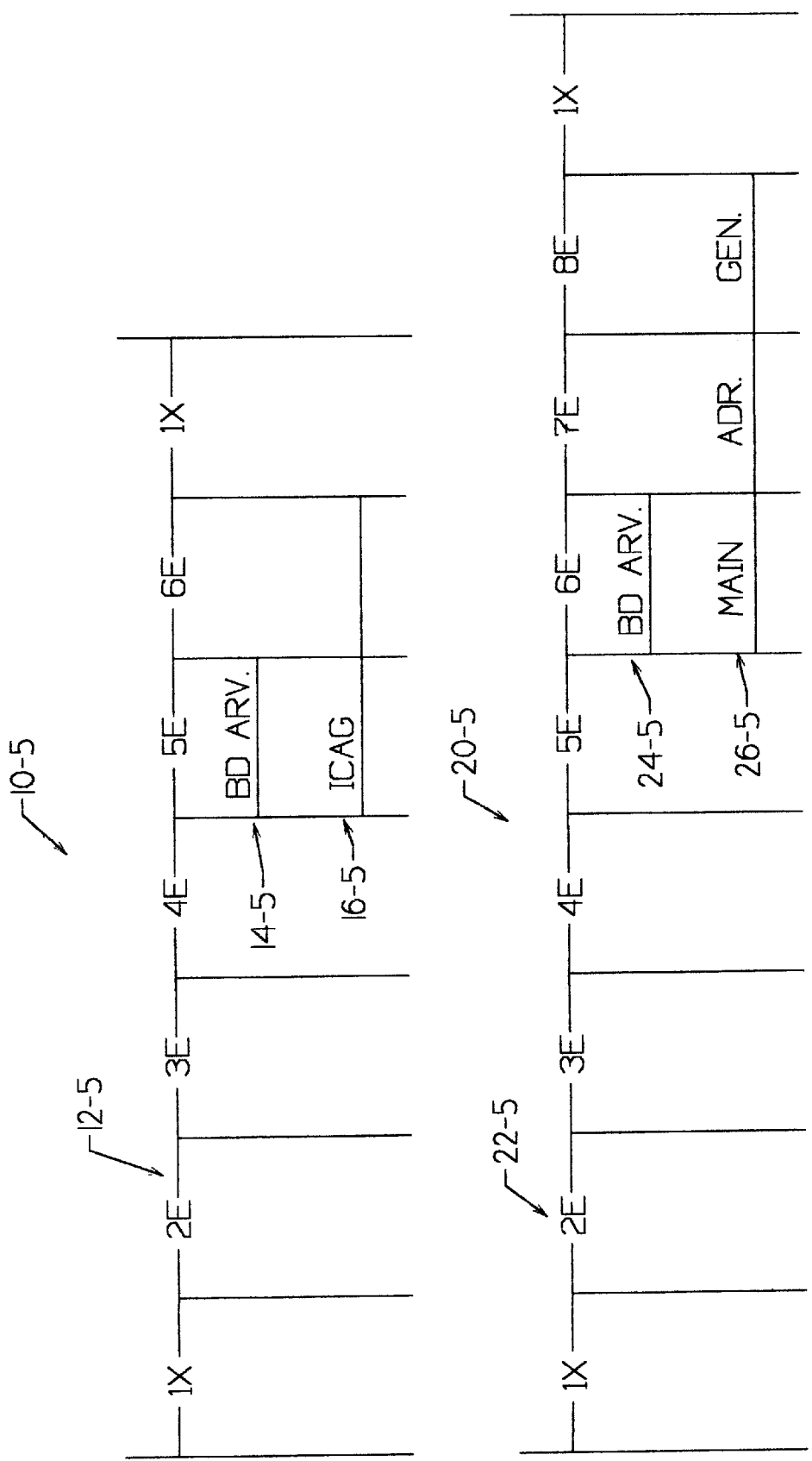
FIG. 5 is a timing chart comparing the previous system with the LXJ fast path.

FIG. 5 shows the time scale 10-5 for the LXJ fast path and time scale 20-5 for the conventional main address generator response. In time scale 10-5, cycles 12-5 show that only 6 cycles are required for the fast path. In time scale 20-5 cycles 22-5 show that 8 cycles are required for the conventional previous approach. This results because in the LXJ fast path the BD Arrive 14-5 is available at cycle 5E, the previous information having been stored in register 82E in FIG. 4 and already being available, whereas in the conventional approach BD arrive 24-5 is not usable until cycle 6E in the main address generator 126. In the LXJ fast path computation of FIG. 4 the adder can complete the entire adding process and make the information available within cycles 5E and 6E, whereas in the main address generator 126 all four base addresses must be accessed and the offset must be checked against the upper limit, the lower limit and against access. The result of these checks are then tested against a priority algorithm before the correct bank is selected. Once the correct bank is selected this absolute address is sent from the main address generator 126 to the instruction address generator over line 126A. The greater amount of computation required to complete the main address generator 126 process compared to adder 82F results in a two cycle advantage whenever the LXJ fast path can be used.

This procedure saves two cycles whenever the LXJ fast path can be used with no time penalty. Since the main address generator always operates in its usual manner and can be selected rather than the absolute address from the LXJ fast path if necessary, there is no time lost over the usual instruction response time when the LXJ fast path is not used.

Further, the system timing is such that the tests for the main address generator are made before the LXJ fast path absolute address executes the instruction. As a consequence, no error is incurred by attempting the LXJ fast path process when the absolute address from the LXJ fast path is incorrect.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. Improved apparatus for generating an absolute instruction address for an instruction, associated with a data bank, sequentially following a previous instruction in a multiprogrammed instruction processor having a main address generator for generating an absolute address and having a plurality of memory data banks, the improvement comprising:

a) testing means for determining whether a fast path means should be attempted comprising;

first testing means for determining whether said instruction is included in a predetermined class of instructions;

second testing means coupled to said first testing means for determining if the instruction is included in a predetermined sunset, if the instruction refers to a different memory data bank than the previous instruction, and if the instruction is a predetermined data type whenever said first testing means determines that said instruction is included within said Predetermined class of instructions, if so, entering the fast path means for generating an absolute address by adding the bank address stored in a bank address register from the previous instruction to an offset obtained from the current instruction, and;

b) limit testing means for determining if an instruction offset is without high and low limits for any of the memory data banks whenever the fast path means is entered;

c) switching means for selecting between the absolute address generated by the main address generator and the absolute address generated by the fast path fear target execution, said switching means selecting said absolute address generated by the main address generator, whenever said fast path means is entered and the limit tests means determines that the offset is without the high and low limits for any of the memory data banks;

d) loading means for loading the bank address register with the bank address specified by the current instruction, said loading means being operated, whenever said fast path is entered and the limit test means determines that the offset is without the high and low limits for any of the memory data banks;

e) correcting means for aborting an instruction incorrectly fetched for execution using the absolute fast path address and instead executing the instruction using the absolute address generated by the main address generator whenever said fast path is entered and the limit test means determines that the offset is without the high and low limits for any of the memory data banks.

2. The apparatus of claim 1 wherein said first testing means comprises means for determining whether an instruction is either a LBJ, a LDJ or a LIJ instruction having an Xa.Is value.

3. The apparatus of claim 2 wherein said second testing means comprises means for determining if the Xa.Is value of an instruction has a value of either 0 or 1, and if the number of the memory data bank referred to by the previous instruction is different than the number of the memory data bank referred to by the current instruction or not, and if the bank descriptor type is one.

4. An improved method for generating an absolute instruction address for an instruction following a previous instruction having a corresponding absolute address in a multiprogrammed instruction processor having a plurality of memory data banks and having a main address generator, the method comprising the steps of:

a) determining whether said instruction is included in a predetermined class of instructions, if included then determining if the instruction is also included in a predetermined subset, and if the instruction does not refer to the same memory data bank as the previous instruction, and if the instruction is a particular data type, and if so, generating an absolute address using a fast path for generating a memory bank reference by adding the bank address stored in a bank address register from the previous instruction to an offset obtained from the current instruction, and;

b) whenever said fast path is entered, determining whether the instruction offset is within the high and low limits for all memory data banks, if within said limits, using the address generated by said fast path to execute the target instruction, otherwise, using the absolute address generated by the main address generator for memory reference, loading the bank address register with the bank address specified by the current instruction, and aborting any instruction incorrectly fetched using the absolute fast path address, and instead using an instruction fetched by the absolute address generated by the main address generator to execute the target instruction.

5. The apparatus of claim 1 wherein said multi programmed instruction processor further comprises a pipelined architecture.

6. The apparatus of claim 3 wherein said multi programmed instruction processor further comprises a pipelined architecture.

7. The apparatus of claim 4 wherein said multi programmed instruction processor further comprises a pipelined architecture.

8. The apparatus of claim 1 wherein said multi programmed instruction processor further comprises a base register and said first testing means and said second testing means determines whether said base register is changed by said instruction.

9. The apparatus of claim 3 wherein said multi programmed instruction processor further comprises a base register and said first testing means and said second testing means determines whether said base register is changed by said instruction.

10. The apparatus of claim 6 wherein said multi programmed instruction processor further comprises a base register and said testing means and said second testing means determines whether said base register is changed by said instruction.

* * * * *